Patented Mar. 11, 1947

2,417,068

UNITED STATES PATENT OFFICE 2,417,068

CATALYTIC SYNTHESIS OF VINYL CYANIDE

Mark Wendell Farlow and Wilbur Arthur Lazier, Wilmington, Del., assignors to E. I. du Pont de Nemours & Company, Wilmington, Del., a corporation of Delaware No Drawing. Application September 27, 1944, Serial No. 556,078

1 Claim. (Cl. 260—464)

The present invention relates to the catalytic synthesis of vinyl cyanide from hydrogen cyanide and acetylene and particularly to the use of liquid phase catalysts consisting of solutions of cuprous salts and their complexes.

The synthesis of vinyl cyanide with such catalysts has been described previously but the methods of the prior art have two serious disadvantages: they produce acetaldehyde, boiling point 20.2° C., together with substantial amounts of unchanged hydrogen cyanide, boiling point 25–26° C., resulting in a serious recovery problem or economic loss; furthermore, the procedures described previously are uneconomical from the standpoint of catalyst cost, in that the activity of the catalyst becomes negligible after a period of a few hours or at most two or three days.

This invention has as an object a process for the substantially complete conversion of hydrogen cyanide to vinyl cyanide. A further object is a process wherein the catalyst employed has high activity for a period of several weeks.

These objects are accomplished by the following invention wherein a mixture of acetylene and hydrogen cyanide in the ratio of from five to seven mols of acetylene per mol of hydrogen cyanide is brought into contact at 80–90° C. with an aqueous solution, of pH 1.0 to 3.0, containing cuprous chloride and a chloride which forms water-soluble complexes with cuprous chloride, e. g., ammonium chloride, at such a rate that from 0.02 to 0.03 part by weight of hydrogen cyanide per part of cuprous chloride per hour is employed and the vinyl cyanide is isolated by distillation.

In the practice of the invention, a mixture of hydrogen cyanide and acetylene in the desired proportions is led into a well agitated, acidic solution containing a cuprous salt such as cuprous chloride. Since a high content of soluble cuprous compound is desirable and since cuprous chloride itself is relatively insoluble, it is necessary also to incorporate in the catalyst any of certain materials which form soluble cuprous complexes and among these ammonium chloride, ethanolamine hydrochloride and potassium chloride may be mentioned. The catalyst functions best when adjusted by acidification with hydrochloric acid to an original pH of about 1.0 to 3.0 and this acidity should be maintained during the life of the catalyst by returning to it any vaporized hydrochloric acid or by adding fresh portions of acid. It is further desirable to add a little metallic copper to the catalyst to reduce the cupric salts ordinarily present in cuprous chloride. The reactants should be essentially oxygen-free since the catalyst is readily susceptible to oxidation, and a catalyst temperature of 80–90° C. is preferred. The hydrogen cyanide velocity should be approximately one part by weight of hydrogen cyanide for 45–50 parts of cuprous chloride per hour, and this condition is of utmost importance since, at higher velocities, the conversion of hydrogen cyanide is incomplete, a part appearing in the reaction product and a part being retained in the catalyst, causing a rapid deterioration in its activity. At lower hydrogen cyanide velocities the space-time yield of vinyl cyanide decreases and the proportion of monovinyl acetylene and other products derived solely from acetylene becomes considerable. An excess of acetylene is necessary to insure complete utilization of the hydrogen cyanide but too great an excess also leads to extensive formation of by-products derived solely from acetylene. The recommended molar ratio is about six to one and the ratio must be kept within the limits of five to one and seven to one (acetylene to hydrogen cyanide).

The warm gases issuing from the catalyst chamber contain vinyl cyanide and unreacted acetylene in major amounts, together with minor amounts of acetaldehyde, water, hydrochloric acid, hydrogen cyanide and polymerization products of acetylene. Refrigeration of the gases to −15° C. or even as low as −60° C. gives a condensate which consists essentially of vinyl cyanide and slightly acidic water. The uncondensed gas, chiefly acetylene, may be recycled.

The more detailed practice of the invention is illustrated by the following examples wherein parts given are by weight. There are, of course, many forms of the invention other than these specific embodiments.

Example I

A catalyst is prepared by mixing 376 parts of cuprous chloride, 125 parts of ammonium chloride, 300 parts of water and 30 parts of powdered copper metal. The catalyst is then heated to 90° C. with good agitation and acidified with concentrated hydrochloric acid to a pH of 2.0 with the aid of a pH meter or a suitable indicator paper. The catalyst is heated and stirred for an additional hour with further addition of small amounts of acid if required to maintain the desired acidity. A total of about 20 parts of concentrated acid is required, the amount depending on the purity of the cuprous chloride. During the entire preparation the catalyst is maintained under an atmosphere of nitrogen or other inert gas to prevent its oxidation by atmospheric oxygen.

A gaseous mixture consisting of 8.0 parts of hydrogen cyanide and 46.2 parts of acetylene per hour is led beneath the surface of the catalyst, which is maintained at 90° C. and vigorously agitated. The gaseous products pass upward through a vertical condenser which maintains, from bottom to top, a temperature gradient of about 0° to −60° C. The condensate drops into a separator from which the lower aqueous layer is returned to the catalyst and the upper layer, crude vinyl cyanide, is drawn off. The uncondensed acetylene may be recycled.

A period of about 30 to 60 minutes is required for the catalyst to reach equilibrium after which there is produced, per hour, about 20 parts of crude vinyl cyanide, which on being dried over calcium chloride and distilled yields the following:

| Product | Boiling range, °C. | Parts by weight |
| --- | --- | --- |
| Monovinyl acetylene | To 20 | 0.5 to 1.0 |
| Hydrogen cyanide | 20–30 | 0.16 |
| Acetaldehyde | 20–30 | 2.0 to 3.0 |
| Vinyl cyanide | 70–78 | 15.0 |

Thus the conversion of hydrogen cyanide to vinyl cyanide is 95% of the theoretical and 2.0% of the hydrogen cyanide is recovered. The off-gas, amounting to about 35–37 parts per hour, can be shown by analysis to contain over 95% of pure acetylene.

When, in the process of Example I, the acetylene/hydrogen cyanide molar ratio is maintained at six to one as above, but the hydrogen cyanide velocity is increased to 10.0 parts per hour, the initial conversion is to 80–85% of the theoretical. At the same ratio and a hydrogen cyanide velocity of 20.0 parts per hour, the initial conversion is 30–50%. If the hydrogen cyanide velocity in Example I is maintained at 8.0 parts per hour and the acetylene/hydrogen cyanide molar ratio is dropped to four to one and two to one, successively, the corresponding initial conversions are 75–80% and 30–40%. It is to be noted further that when the catalyst is operated at initial conversions below about 85%, its activity drops so rapidly that catalyst cost becomes prohibitive. Thus at a six to one acetylene/hydrogen cyanide molar ratio and a hydrogen cyanide velocity of 20 parts per hour, the conversion at three successive six-hour periods are 42%, 38%, and 33%. On the other hand, when the catalyst is operated at conversions of about 90% and above, it retains its initial activity for a period of several weeks. The catalyst slowly loses hydrochloric acid. When operating for long periods of time, the loss should be determined periodically by analysis and a corresponding amount added to the catalyst.

*Example II*

A catalyst is prepared in an inert atmosphere by mixing 143 parts of ethanolamine, 376 parts of cuprous chloride, 210 parts of water and 30 parts of copper powder. The catalyst is then acidified at 90° C. to a pH of 2.0, 250 parts of concentrated hydrochloric acid being required. The process is operated as in Example I with a flow of 8.0 and 46.2 parts per hour of hydrogen cyanide and acetylene, respectively. The conversion to vinyl cyanide is 90% of the theoretical and the crude product contains 2% of the original hydrogen cyanide.

In the process of this invention there is employed as catalyst an aqueous acid solution of pH 1.0 to 3.0 containing a water-soluble cuprous chloride complex. The other chloride of the complex is one which is known to form a water-soluble acid stable complex with cuprous chloride, e. g., ammonium and alkali metal chlorides, and amine hydrochlorides. The solution contains at least 0.5 gm. cuprous chloride per cubic centimeter of solution.

The temperature range 80–90° C. is necessary since at lower and higher temperatures the rate of conversion to vinyl cyanide is appreciably lower.

The hydrogen cyanide velocity and acetylene/hydrogen cyanide ratio must be controlled within the rather narrow limits stated, i. e., the hydrogen cyanide velocity must be 0.02 to 0.03 part by weight per part of cuprous chloride per hour and the acetylene/hydrogen cyanide molar ratio must be between five to one and seven to one since, as disclosed above, these conditions are necessary for substantially complete utilization of the hydrogen cyanide together with effectively long catalyst life.

The above description and examples are intended to be illustrative only. Any modification thereof or variation therefrom which conforms to the spirit of the invention is intended to be included within the scope of the claim.

What is claimed is:

Process for preparing vinyl cyanide which comprises bringing a mixture of about six mols of acetylene and one mol of hydrogen cyanide in contact, at 80–90° C., with an aqueous solution, of pH of 2.0, of a cuprous chloride/ammonium chloride complex at the rate of about 0.021 part by weight of hydrogen cyanide per hour per part by weight of cuprous chloride, said cuprous chloride solution containing at least 0.5 gram cuprous chloride per cubic centimeter of solution.

MARK WENDELL FARLOW.
WILBUR ARTHUR LAZIER.

REFERENCES CITED

The following references are of record in the file of this patent:

UNITED STATES PATENTS

| Number | Name | Date |
| --- | --- | --- |
| 2,322,696 | Kurtz et al. | June 22, 1943 |
| 2,324,954 | Kurtz et al. | July 20, 1943 |
| 2,385,327 | Bradley et al. | Sept. 25, 1945 |
| 2,385,469 | Salley | Sept. 25, 1945 |
| 2,385,470 | Salley et al. | Sept. 25, 1945 |

FOREIGN PATENTS

| Number | Country | Date |
| --- | --- | --- |
| 217,478 | Switzerland | Feb. 2, 1942 |